United States Patent [19]

Nelson

[11] Patent Number: 4,777,358

[45] Date of Patent: Oct. 11, 1988

[54] OPTICAL DIFFERENTIAL STRAIN GAUGE

[75] Inventor: Bruce N. Nelson, South Boston, Mass.

[73] Assignee: Geo-Centers, Inc., Newton Centre, Mass.

[21] Appl. No.: 32,473

[22] Filed: Mar. 30, 1987

[51] Int. Cl.$^4$ ................................................ G01L 1/24
[52] U.S. Cl. .................................. 250/225; 250/231 R; 73/800; 356/35.5
[58] Field of Search ............ 250/231 R, 225; 73/800; 350/371, 372, 373; 356/35.5

[56] References Cited

U.S. PATENT DOCUMENTS

| | | | |
|---|---|---|---|
| 4,648,274 | 3/1987 | Trainer | 73/800 |
| 4,679,933 | 7/1987 | Pindera | 73/800 |
| 4,703,918 | 11/1987 | Pindera | 73/800 |

*Primary Examiner*—David C. Nelms
*Assistant Examiner*—Jessica L. Ruoff
*Attorney, Agent, or Firm*—Wolf, Greenfield & Sacks

[57] ABSTRACT

An optical strain gauge has a first birefringent optical module secured to a specimen bar in a manner transferring tensile strain from the bar to the module and has a similar second birefringent module secured to the bar in a manner transferring shear strain from the bar to the module. The two modules are disposed in series in a light path along which polarized light is directed. A polarization rotator is situated in that path between the two modules and causes the phase shift between two polarized components of the light to optically subtract. The optical subtraction arrangement conduces to making the gauge insensitive to environmental effects because stresses imposed by those environmetal effects equally upon both modules result in optical cancellation of the effects of those stresses on the modules. Those two polarized components, after passing through both modules, are separated to obtain a measure of the difference between the transferred tensile strength and the transferred shear strain.

5 Claims, 4 Drawing Sheets

OPTICAL DIFFERENTIAL STRAIN GAUGE

FIELD OF THE INVENTION

This invention relates in general to strain gauges of the optical type. More particularly, the invention pertains to an optical gauge that utilizes the birefringent properties of optical elements for the measurement of strain.

BACKGROUND OF THE INVENTION

Strain gauges that rely upon a change in an electrical characteristic, such as a change in resistance or capacitance, in response to applied strain are well known and have been widely employed for many years past. Because such strain gauges require electrical power for their operation, those gauges present a hazard in environments where electricity can cause an explosion or a fire or cause an electrical shock to personnel. Further, the presence of electrical power can interfere with the performance of sensitive equipment and the performance of the electrical strain gauge itself may be adversely affected by electromagnetic interference generated by other apparatus in its vicinity. In addition, the electrical current flowing in the gauge generates heat which tends to affect the performance of the gauge. In the terminology of the electrical engineer, the performance of the conventional electrical strain gauge can be adversely affected by EMI (electromagnetic interference), the gauge may be adversely affected by heat genterated by current flow in the gauge, and the gauge itself may be a source of "noise" (i.e. electromagnetic radiation) for other electrical and electronic apparatus. Electromagnetic interference, for example severely limits the use of electrical strain gauges in or near electric arc welding equipment. Consequently, efforts have been made to develop non-electrical strain gauges for use in high EMI environments and for use in those environments where the presence of electricity is dangerous.

OBJECTS OF THE INVENTION

The principal object of the invention is to provide an optical strain gauge which equals or betters the performance of electrical strain gauges, which can operate without the presence of electricity at the site of the gauge, which is substantially immune to electromagnetic interference, and which does not itself generate electrical noise.

Another object of the invention is to provide an optical strain gauge that is relatively unaffected by environmental and other factors which impair the reliability and accuracy of conventional strain gauges both of the optical and electrical types.

THE INVENTION

The invention resides in an optical strain gauge having a first photoelastic optical element secured to a specimen bar in a manner causing the tensile strain imposed on the specimen bar to be transferred to the photoelastic element. Also situated on that bar is a second photoelastic optical element which is secured to the bar in a manner transferring shear strain from the bar to that second element. The two optical elements are arranged in series in a light path along which polarized light travels. The strain transferred to the photoelastic optical element and stresses arising from the environment that act on the optical element cause a phase shift in two components of the polarized light propagating through the optical element. Disposed in the light path between the two photoelastic elements is a polarization rotator which causes the phase shift between two orthogonal components of the polarized light to optically subtract when equal stresses are imposed on both photoelastic elements. After the polarized light has passed through both photoelastic elements, the orthogonal components of that polarized light are separated to obtain a measure of the difference between the transferred tensile strain and the transferred shear strain. Environmental stresses that are equally imposed on the two optical elements do not affect the measurement because those stresses have equal and opposite effects upon the phase shift of the two orthogonal components of the polarized light.

In an embodiment of the invention, one of the photoelastic elements is attached to the face of the specimen bar opposite to the face of the bar to which the other photoelastic element is attached. To avoid having to put a hole in the specimen bar for the passage of the polarized light from one element to the other, a fiber optic line is used to direct the polarized light passing through the first element to the edge of the specimen bar and thence around the edge to the other element. By cutting that fiber optic line in two, rotating one segment through 90°, and then rejoining the two segments, the rejoined fiber optic line acts as the polarization rotator.

The Drawings

Figure 4:
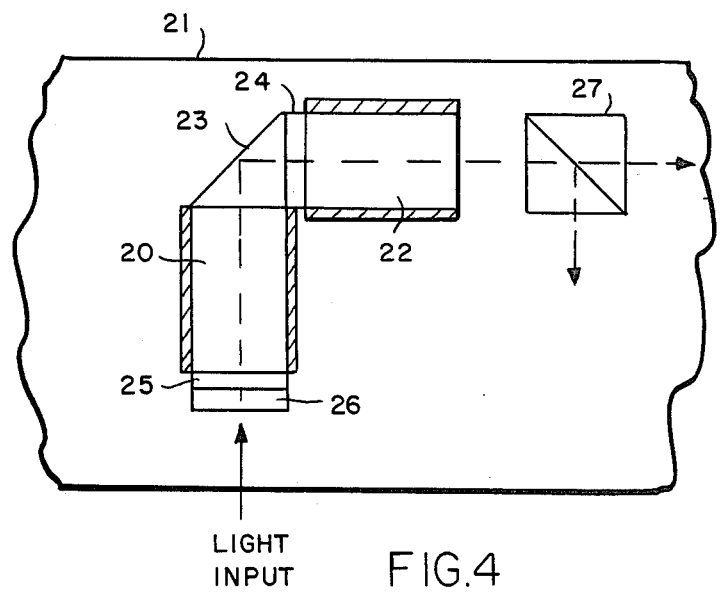

FIG. 4 schematically depicts a portion of the preferred embodiment of the invention.

Figure 5:
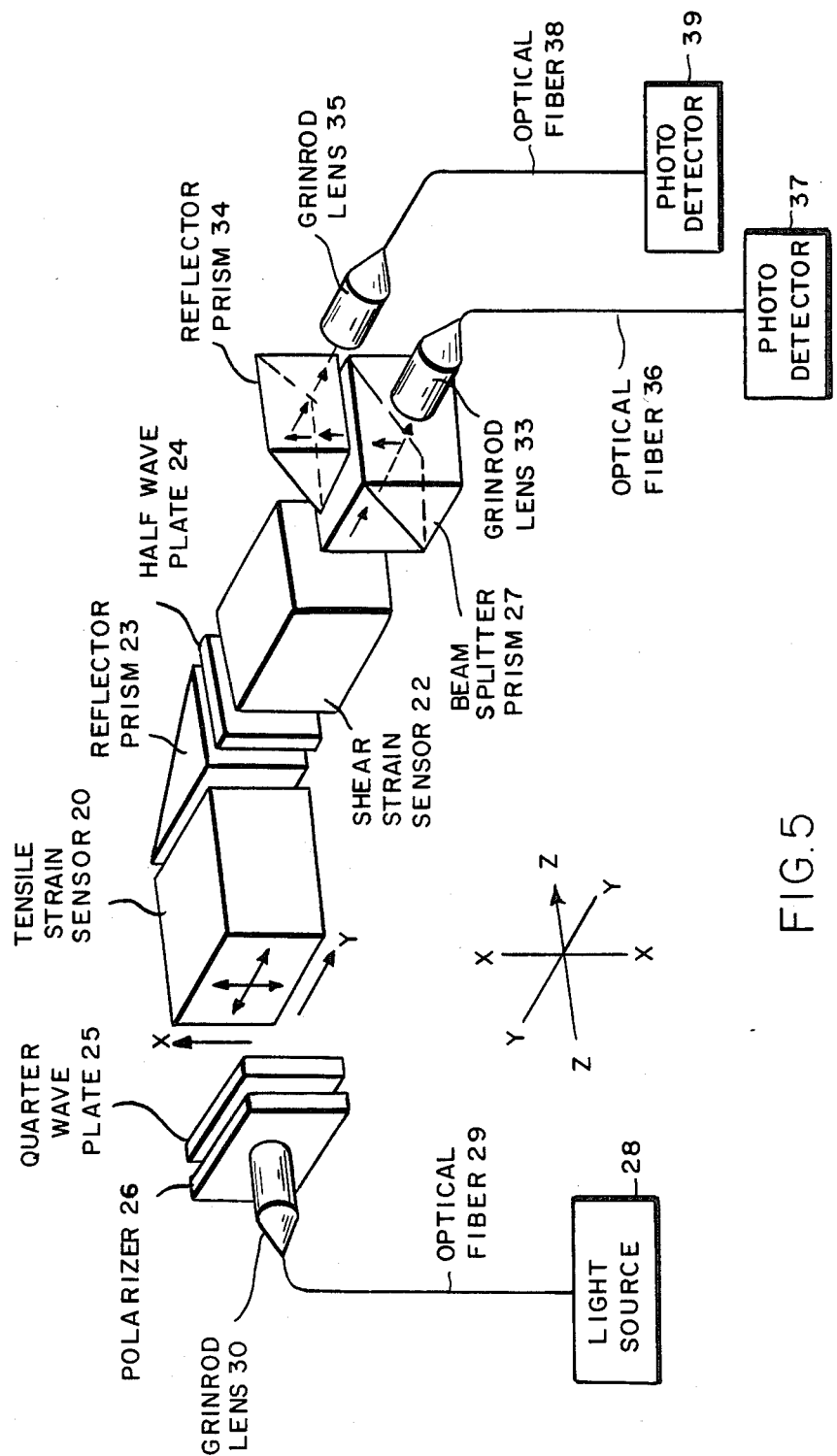

FIG. 5 is an exploded view which schematically depicts the preferred embodiment of the invention.

Figure 6:
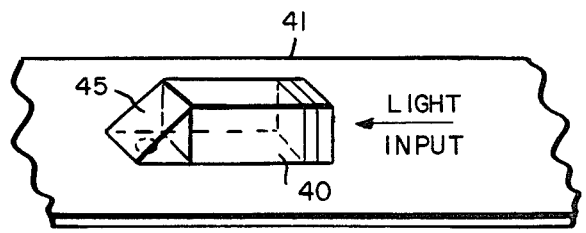

FIG. 6 schematically depicts a variation of the preferred embodiment of the invention.

Figure 7:
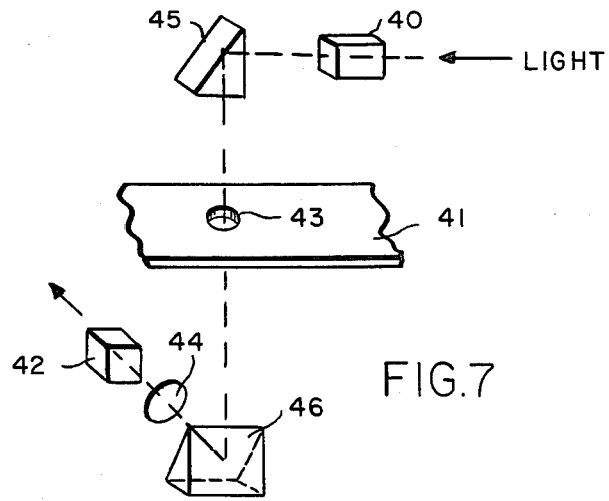

FIG. 7 schematically depicts a periscope arrangement used in a variation of the preferred embodiment.

Figure 8:
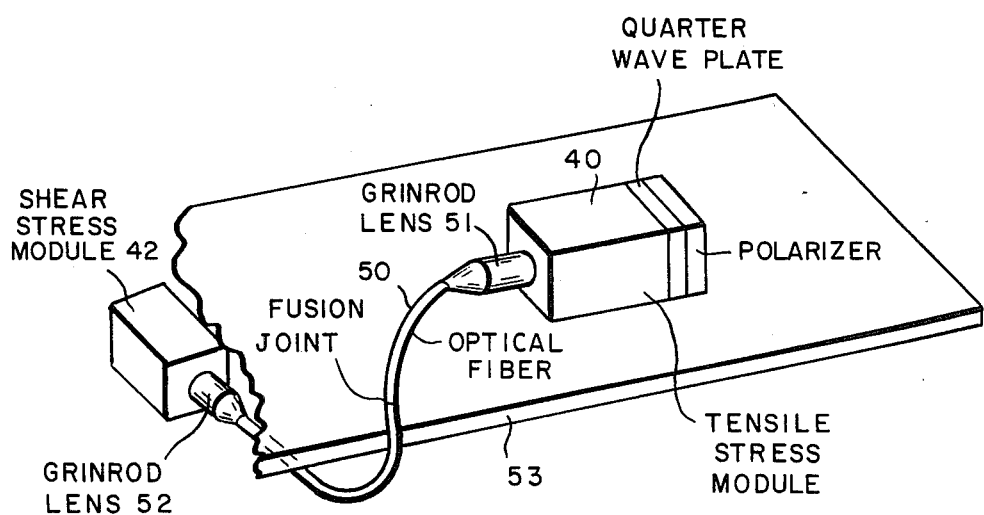

FIG. 8 schematically depicts a fiber optic light transmitter used in a variation of the preferred embodiment.

DETAILED DESCRIPTION OF EMBODIMENTS OF THE INVENTION

Figure 1:
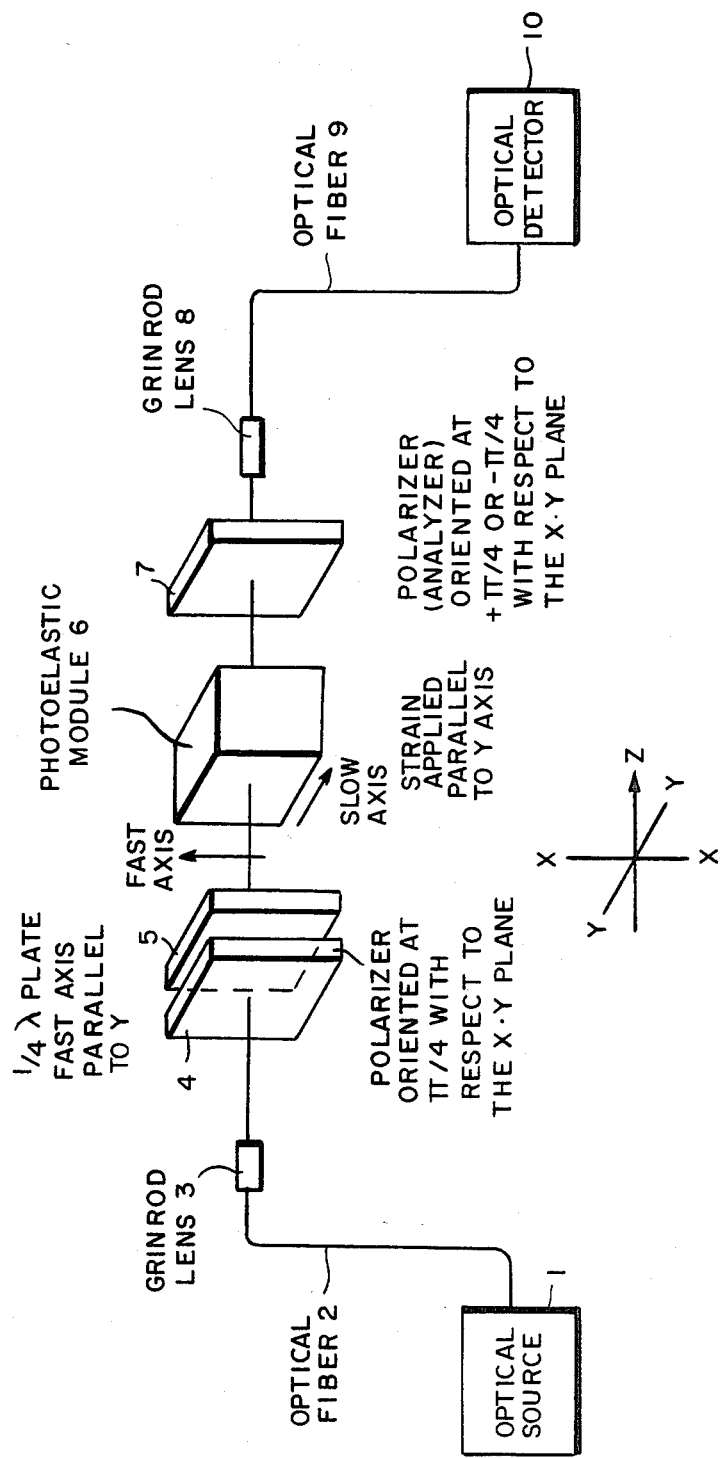
FIG. 1 is an exploded view which schematically depicts the arrangement of a rudimentary optical strain gauge.

A rudimentary optical strain gauge is schematically depicted in FIG. 1. In that schematic arrangement, a source of illumination 1 provides light that is transmitted along an optical fiber light guide 2 to a lens 3 that collimates the light and beams the light toward a polarizer 4. The light source, preferably, is a device such as a laser that provides coherent light of substantially one wavelength or light having a narrow range of wavelengths centered around the principal wavelength. Other sources of light such as light emitting diodes may be employed in place of or in addition to a laser. The plane polarized light leaving polarizer 4 passes through an optical quarter wave plate 5 and emerges from that plate as circularly polarized light. The polarized light then enters strain sensor module 6 of photoelastic material, i.e. an optical material that exhibits birefringence when subjected to strain. Photoelasticity is the phenomenon of strain (or stress) induced birefringence in optically transparent materials. Many of those materials, in their unstressed state are isotropic (i.e., the velocity of light within the material is the same in all directions). When a uniaxial strain is applied to those materials, a difference in the index of refraction is introduced between the strain direction and directions orthogonal to it that causes the speed of light in the material to be different in at least the strain direction.

In the photoelastic module of FIG. 1, for example, strain applied to the module along the Y axis causes the index of refraction along that axis to increase while the index of refraction along the X axis remains unchanged. A beam of light polarized in the Y direction propagates in the module at a slower speed than a beam of light polarized in the X direction. Consequently, the Y axis is termed the "slow" axis and the X axis is termed the "fast" axis. If circularly polarized light is incident on the module and the module is strained to induce birefringence, then a phase shift proportional to the strain is introduced between the component of that light that is polarized parallel to the Y axis and the component of that light that is polarized parallel to the X axis. The light emerging from the sensor module 6 is then passed through an analyzer 7. The analyzer is a polarizer whose plane of polarization is oriented at $+\pi/4$ or $-\pi/4$ (i.e. $+45°$ or $-45°$) with respect to the module's X or Y axis. The light transmitted through the analyzer 7 is then focused by a lens 8 upon the input end of an optical fiber conduit 9 which guides that light to an optical detector 10 that measures the intensity of the light incident on that detector.

Figure 2:
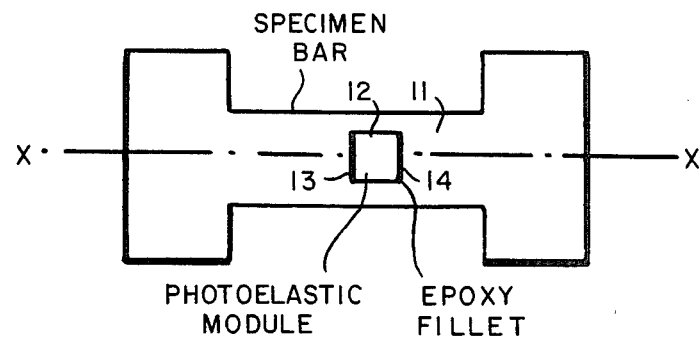
FIG. 2 shows a tensile strain photoelastic sensor disposed upon a member which is strained by applied tensile forces.

Referring now to FIG. 2, there is shown a metal specimen bar 11 having a photoelastic module 12 mounted on it to sense the strain of the bar caused by tensile forces applied to the ends of the bar. The test specimen bar is made of an elastic material such as steel and the applied tensile forces preferably do not exceed the elastic limit of the bar material. The photoelastic module is in the form of a rectangular solid having its base lying flat against the surface of the bar. To transfer the strain from the bar to the photoelastic module, the module is attached to the bar by an adhesive, such as an epoxy, along the lower two parallel edges of the rectangular solid. For better adhesion the lower edges of the module and the adjacent areas of the bar are roughened with an abrasive. The epoxy adhesive preferably is applied as a fillet along the two parallel lower edges of the module, as indicated in FIG. 1. To measure tensile strain, the adhesive is preferable applied in two lines perpendicular to the strain direction. Thus in FIG. 2, where the strain direction is along the X axis, the two lines of epoxy 13 and 14 are laid down transversely to the X axis. Where the areas of the bar adjacent to the filleted edges of the module have been roughened, some of the epoxy is drawn by capillary action under the module and enhances the adhesion of the module to the bar. The tensile strain on the bar is thus transferred to the module and induces birefringence in that module that is proportional to the strain on the bar.

Figure 3:
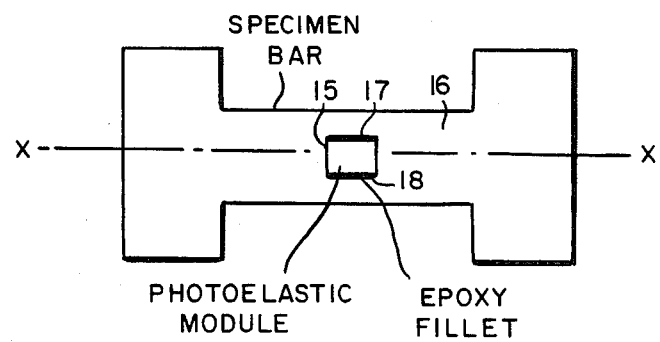
FIG. 3 shows a shear strain photoelastic sensor disposed upon a member to which shear forces are applied.

FIG. 3 Shows the disposition of a photoelastic module 15 for sensing strain in the bar 16 caused by shear forces applied to that bar. The module 15 is secured to test specimen bar 16 in substantially the same manner previously described in connection with FIG. 2, except that the two lines of epoxy fillets 17 and 18 are now disposed longitudinally of the bar rather than transversely to it. By that arrangement, the shear strain transferred from the bar 16 to the photoelastic module induces birefringence in the module that is related to the shear strain of the bar.

FIG. 4 schematically depicts some of the elements of an optical strain sensor embodying the invention. In that embodiment, a photoelastic module 20 is secured to a test specimen bar 21 in the manner previously described for sensing tensile strain. A second photoelastic module 22 is attached to the bar 21 in the manner previously described for sensing shear strain. Consequently, the module 22 is perpendicularly disposed with respect to module 20. Situated between one end of module 20 and the adjacent end of module 22 is a prism 23 that reflects light coming out of tensile strain sensor module 20 toward shear strain module 22. Interposed between prism 23 and shear strain sensor module 22 is a half wave plate 24 whose rotational effect on the polarized light will presently be discussed. Disposed in front of the tensile strain sensor photoelastic module 20 is a quarter wave plate 25 which is preceded by polarizer 26 in the same sequence depicted in FIG. 1. At the light exiting end of photoelastic shear strain sensor module 22 is disposed a polarizing prism 27.

For comparison with the FIG. 1 arrangement, the complete arrangement of the FIG. 4 embodiment is schematically depicted in the exploded view of FIG. 5. It can be appreciated from a comparison of those schematic drawings that the reflector prism 23, the half wave plate 24, and the photoelastic module 22 have, in essence, been inserted in that order between the photoelastic module 6 and the analyzer 7 in the FIG. 1 arrangement and that the analyzer of the FIG. 1 arrangement has been replaced by polarizing prism 27.

Considering now the FIG. 5 arrangement, in which photoelastic module 20 is arranged to sense tensile strain and photoelastic module 22 is arranged to sense shear strain, the light source 28 is arranged to provide light of substantially one wavelength (or of a narrow range of wavelengths that is preferably centered about one predetermined wavelength) which is transmitted along the fiber optic light guide 29 to a grinrod lens 30 that beams that light toward the polarizer 26. The light which passes into that polarizer emerges from quarter wave plate 25 as circularly polarized light. The quarter wave plate can be omitted from the apparatus but if it is omitted from the apparatus, then the light emerging from the polarizer must be oriented at $\pm\pi/4$ with respect to the modules' X or Y axis. Assuming that the light entering module 20 is circularly polarized, the speed of propagation of the component of that light which is polarized parallel to the Y axis is affected by the strain imposed on the module whereas the speed of propagation of the component of that light polarized parallel to the X axis stays unchanged. Consequently the two components of light emerge from the module 20 with a phase difference that is related to the imposed strain and to the length L of the module.

It can be appreciated that the stress imposed on module 20 can be due to environmental factors such as temperature, humidity, vibration, acceleration, air pressure, etc. in addition to the strain transferred from the bar on which the sensor is disposed. The stress imposed by those other factors can, unless dealt with, impair the reliability and accuracy of the strain measurement. By means of the arrangement schematically depicted in FIGS. 4 and 5, all the factors except those of tensile strain and shear strain are optically rejected and the gauge measures only the difference between tensile strain and shear strain. Consequently, no special measures need be taken to compensate the gauge for the effects of environmental or other extraneous factors as the gauge will optically reject the effects of those factors. The photoelastic module 20 and the photoelastic module 22, like the module 6 in FIG. 1, each has a fast axis and a slow axis. In the FIG. 5 arrangement, the module 20 is strained in the Y axis direction; consequently, light polarized in the X axis direction propagates through the module faster than light polarized in the Y axis direction. The difference in the speed of propagation is proportional to the strain imposed on module 20 and the two components of light exiting from module 20 have a total phase difference $\phi_{A1}$ that is due to the phase change $\phi_T$ caused by the tensile strain and the phase change $\phi_E$ that is due to other stresses imposed on the module by extraneous factors, i.e.

$$\phi_{A1} = \phi_T + \phi_E$$

where $\phi_{A1}$ is the phase shift due to all causes
$\phi_T$ is the phase shift due to tensile strain
$\phi_E$ is the phase shift due to other causes.

The polarized light exiting from module 20 enters reflector prism 23 and is reflected by that prism toward half wave plate 24. That polarized light, in passing through the half wave plate, is rotated through 90° by the polarization rotational effect of the plate. Consequently, X axis polarized light entering the half wave plate leaves that plate polarized along or parallel to the Y axis and entering light polarized along or parallel to the Y axis leaves the half wave plate polarized in the X axis direction. As a consequence, light that traveled through module 20 along its fast axis is injected into module 22 along its slow axis; as a corollary, light that traveled through module 20 along its slow axis, enters module 22 along its fast axis.

The module 22 is strained in the Y axis direction by the shear strain transferred from the test specimen bar 21. That module is also exposed to and is stressed by the same environmental and other extraneous factors that act upon module 20. Consequently a phase shift in the components of polarized light proportionate to the stress on module 22 is caused by the stress induced birefringence of module 22. However, the polarization rotation provided by half wave plate 24 causes that phase shift to occur in the direction opposite to the direction of the phase shift that took place in module 20. That is, if the phase shift occurring in module 20 is deemed to be in the positive direction, then the phase shift in module 22 occurs in the negative direction. The total phase shift $-\phi_{A2}$ induced in the light exiting passing through module 22 is due to the phase shift $-\phi_S$ caused by the shear strain and the phase shift $-\phi_E$ caused by environmental and other extraneous factors. Adding the phase shifts that occurred in the passage of the light through the optical system, the resultant phase shift is given by $$\phi_{A1}\phi_{A2} = \phi_T + \phi_S - \phi_E$$

Where modules 20 and 22 are of the same length L and have the same photoelastic properties (i.e. where the two modules are identical or closely matched), the $\phi_e$'s cancel and the resultant is $$\phi_T - \phi_S$$

where $\phi_T$ is the phase shift due to tensile strain
$\phi_S$ is the phase shift due to shear strain Consequently the gauge measures the difference between tensile strain and shear strain and the measurement is virtually unaffected by environmental and other extraneous factors.

To measure the resultant phase difference, the polarized light exiting from module 22 is beamed into a polarized beam splitter prism 27 where one polarized component of the light passes through the prism 27 to the grinrod lens 33 and another polarized component of the light is diverted to a reflector prism 34 which deflects the light to a grinrod lens 35, as indicated by the broken line with arrowheads in FIG. 5. Light collected by grinrod lens 33 is transmitted along optical fiber 36 to a photo detector 37 which responds to the intensity of the received polarized light. Similarly, light collected by grinrod lens 34 is transmitted along optical fiber 38 to a photo detector 39 that responds to the intensity of the received polarized light. The light input to photo detector 37 is made oy butting the end of optical fiber 36 against the light input window of detector 37 and the light input to photo detector 38 is made in like manner by butting the end of optical fiber 39 against the light input window of detector 39. Each of those detectors, in response to the light incident upon them, emits electrical signals that are transmitted to other electrical apparatus for processing. The prism 27 separates out the polarization components of the light exiting from module 22 that correspond to $+\pi/4$ and $-\pi/4$ relative to the Y axis of that module.

The light intensities $I_1$ and $I_2$ of those components will vary according to the difference between the tensile strain and the shear strain as follows:

$$I_1 = I_0 \sin^2\left[\frac{\pi L}{\lambda} k\epsilon(\phi_T - \phi_S) + \frac{\pi}{4}\right]$$

$$I_2 = I_0 \sin^2\left[\frac{\pi L}{\lambda} k\epsilon(\phi_T - \phi_S) - \frac{\pi}{4}\right]$$

where $I_0$ = light intensity incident on module 20
L = length of modules 20 and 22 (assumed to be of the same length)
$\lambda$ = wavelength of the incident light
k = optical coefficient of the photoelastic modules which also takes Young's modulus into account (the coefficient is assumed to be the same for both modules)
$\phi_T$ = tensile strain
$\phi_S$ = shear strain In the FIG. 4 embodiment of the invention, both the tensile strain sensor module 20 and shear strain sensor module 22 are disposed on the same side of test specimen bar 21. In some situations, it may be advantageous to have one of those sensors disposed on the opposite side of the test specimen. Such an arrangement is schematically depicted in FIG. 6 which shows a tensile strain sensor module 40 disposed on one side of a test specimen bar 41 and a shear strain sensor module 42 disposed on the other side of that bar. To enable the light exiting from module 40 to be transmitted through a polarization rotator such as a half wave plate and thence to the module 42, a small round hole is cut through the specimen bar 21 for the passage of light. Where it is preferred not to change the characteristics of the specimen bar 41, the light path can be altered to have the light pass down the side of the bar to avoid having to cut through the test specimen bar. Such an alternate arrangement is schematically depicted in FIG. 8 and will presently be described herein in more detail.

Reverting now to FIG. 6, a periscopic arrangement is employed to transmit the light from the exit end of module 40, through the hole 43 in the specimen bar 41 and thence to the half wave plate 44 disposed in front of the light input end of module 42. The periscope, as indicated in FIG. 7, has a prism 45 that deflects light downward through the hole in the specimen bar to another prism 46 that deflects the light toward the half wave plate 44. The polarized light passing through the half wave plate is rotated through 90° and is then incident on shear strain sensor module 42. Apart from the disposition of the sensor modules on opposite sides of the test specimen bar and the use of a periscope to deflect light down through the specimen bar, the arrangement is similar to the one schematically depicted in FIG. 5.

To avoid having to cut a hole in the test specimen bar 41, the periscope can be situated at the edge of the bar and the light beam can then be deflected toward and away from the periscope by prisms or mirrors.

As an alternative to using a periscope at the edge of the specimen bar (and to avoid cutting through the bar), a single mode optical fiber light guide 50 can be employed, as indicated in FIG. 8 to tansmit the polarized light from module 40 to module 42, using the optical fiber light guide as the polarization rotator in place of a half wave plate. In the FIG. 8 embodiment, the light exiting module 40 is collected by a grinrod lens 51 (i.e., a graded index rod lens) and transmitted to the single mode optical fiber transmission line 50. That transmission line is flexible and easily passes around the edge of the specimen bar 53. At the other end of the transmission line, a grinrod lens 52 is employed to direct a collimated beam of light into module 42.

To enable the single mode optical fiber light transmission line to act as a polarization rotator, the single mode optical fiber is sheared into two pieces, one piece is turned through 90° relative to the other piece, and the two pieces of the line are then joined together end to end by a fusion splice. The X and Y axes of the rotated segment of the line therefore are disposed at 90° relative to the X and Y axes of the unrotated segment. Consequently, light polarized along the X axis of the unrotated segment enters the rotated segment along its Y axis and light polarized along the Y axis of the unrotated segment enters the rotated segment along its X axis. Instead of splicing the lines together by fusion, a film of epoxy adhesive may be used to hold the abutted ends of the two lines together. In most other respects, the FIG. 8 embodiment is similar to the arrangement schematically shown in FIG. 5.

Obvious modifications that do not depart from the essentials of the invention are apparent to persons skilled in the optical gauge art. In view of those obvious changes, it is intended that the invention not be limited to the precise embodiments shown in the drawings or disclosed in the specification. Rather, it is intended that the scope of the invention be construed in accordance with the accompanying claims, having due consideration for changes that merely involve the substitution of equivalents or that are otherwise evident.

I claim:
1. A differential strain gauge comprising
   (i) a test specimen member,
   (ii) first and second optical modules of the kind exhibiting birefringence when strained, the first and second modules being disposed in series in a light transmission path,
   (iii) means for transferring tensile strain from the test specimen member to one of the modules,
   (iv) means for transferring shear strain from the test specimen member to the other of those modules,
   (v) a source of polarized light,
   (vi) means for directing the polarized light into the first optical module for propagation along the light transmission path,
   (vii) a polarization rotator disposed in the light transmission path between said first and second modules,
   (viii) polarization separator means for separating polarized components of the light passing out of the second module into at least two components that are polarized in different planes, and
   (ix) means responsive to the separated components for providing a measure of the difference between the transferred tensile strain and the transferred shear strain.
2. The differential strain gauge according to claim 1 wherein the first and second optical modules are secured to opposite faces of the test specimen member, and further including
   means for transmitting the polarized light passing through the first optical module around the edge of the test specimen member to the second optical member.
3. The differential strain gauge according to claim 2, wherein the means for transmitting the polarized light around the edge of the test specimen member is a flexible fiber optic line.
4. Tne differential strain gauge according to claim 1, wherein the polarization rotator is a single mode fiber optic line which causes polarized light passing through the entire length of the line to be rotated 90° relative to the polarization of the light when it entered that line.
5. The differential strain gauge according to claim 1 wherein the first and second optical modules are secured to opposite faces of the test specimen member, and further including an optical periscope for causing the light transmission path to pass from one face to the other face through a window in the specimen member.

* * * * *